United States Patent [19]

Stifelman et al.

[11] Patent Number: 5,104,537
[45] Date of Patent: Apr. 14, 1992

[54] HIGH PRESSURE HYDRAULIC SPIN-ON FILTER

[75] Inventors: Jack Stifelman, Bloomington; Jeff J. Theisen, Prior Lake, both of Minn.

[73] Assignee: Donaldson Company, Inc., Minneapolis, Minn.

[21] Appl. No.: 556,035

[22] Filed: Jul. 20, 1990

[51] Int. Cl.$^5$ .............................................. B01D 27/08
[52] U.S. Cl. ................... 210/440; 210/441; 210/443; 210/444; 210/446; 210/447; 210/450
[58] Field of Search ............... 210/440, 441, 443, 444, 210/446, 447, 450, 454, 497.01, DIG. 17; 55/498, 502, 503

[56] References Cited

U.S. PATENT DOCUMENTS

| 1,851,938 | 3/1932 | Rieke. | |
|---|---|---|---|
| 2,098,102 | 11/1937 | McLean. | |
| 2,758,719 | 8/1956 | Line | 210/131 |
| 2,937,756 | 5/1960 | Humbert, Jr. | 210/444 |
| 2,979,208 | 4/1961 | Humbert, Jr. | 210/232 |
| 3,000,506 | 9/1961 | Hultgren | 210/133 |
| 3,085,688 | 4/1963 | Eberle | 210/232 |
| 3,217,942 | 11/1965 | Humbert, Jr. et al. | 222/189 |
| 3,232,437 | 2/1966 | Hultgren | 210/440 |
| 3,304,562 | 2/1967 | Schmidt et al.. | |
| 3,307,705 | 3/1967 | Halmenschlager. | |
| 3,367,507 | 2/1968 | Hultgren | 210/134 |
| 3,557,963 | 1/1971 | Offer et al. | 210/443 |
| 3,567,023 | 3/1971 | Buckman et al. | 210/130 |
| 3,616,933 | 11/1971 | Baldwin | 210/440 |
| 3,625,363 | 12/1971 | Eberle | 210/130 |
| 3,677,412 | 7/1972 | Connor | 210/440 |
| 3,685,658 | 8/1972 | Baldwin | 210/440 |
| 3,719,281 | 3/1973 | Dieringer | 210/440 |
| 3,726,403 | 4/1973 | Shaltis | 210/132 |
| 3,859,216 | 1/1975 | Sisson et al. | 210/440 |
| 3,875,651 | 4/1975 | La Croce | 29/432.2 |
| 4,028,243 | 6/1977 | Offer et al. | 210/130 |
| 4,045,349 | 8/1977 | Humbert, Jr. | 210/232 |
| 4,127,484 | 11/1978 | Walulik et al. | 210/130 |
| 4,144,168 | 3/1979 | Thornton | 210/130 |
| 4,168,237 | 9/1979 | Pickett et al. | 210/440 |
| 4,169,058 | 9/1979 | Pickett et al. | 210/440 |
| 4,241,491 | 12/1980 | Hopp | 29/511 |
| 4,246,109 | 1/1981 | Manders | 210/90 |
| 4,253,954 | 3/1981 | Midkiff et al. | 210/168 |
| 4,314,903 | 2/1982 | Hanley | 210/440 |
| 4,324,660 | 4/1982 | Peyton et al. | 210/440 |
| 4,369,113 | 1/1983 | Stifelman | 210/440 |

(List continued on next page.)

FOREIGN PATENT DOCUMENTS

| 1611162 | 9/1971 | Fed. Rep. of Germany. |
| 2456428 | 12/1976 | Fed. Rep. of Germany. |
| 2226199 | 11/1974 | France. |
| 2327812 | 10/1975 | France. |
| 1066308 | 4/1967 | United Kingdom. |
| 1254274 | 11/1971 | United Kingdom. |

Primary Examiner—Robert A. Dawson
Assistant Examiner—Wanda L. Millard
Attorney, Agent, or Firm—Merchant, Gould, Smith, Edell, Welter & Schmidt

[57] ABSTRACT

A high pressure spin-on filter is provided having a generally cylindrical filter housing with an open end and a closed end. A generally cylindrical filter element having a closed end and an open end is disposed within the housing. A multifunctional rigid cover is disposed in the open end of the housing and includes a circular rim member extending into the housing. The rim member has an axial bore extending through the rim member and defines an inner surface. The inner surface is partially threaded and further has a groove formed in the inner surface. A main seal is located in the groove of the rim member. The rigid cover further includes a circular hub member having an axial bore through the hub member concentric with the axial bore of the rim member. A plurality of ribs interconnect the rib member to the hub member and cooperate with the rib member and the hub member to define a plurality of openings between the rib member and the hub member. Structure is provided for mounting the cover to the filter housing. The threads and main seal permit threaded and sealing connection of the filter to a filter head assembly such that fluid is directed from the filter head assembly through the filter for filtering.

21 Claims, 3 Drawing Sheets

U.S. PATENT DOCUMENTS

| | | | |
|---|---|---|---|
| 4,378,174 | 3/1983 | Hesse | 403/274 |
| 4,400,864 | 8/1983 | Peyton et al. | 29/508 |
| 4,510,660 | 4/1985 | Hoeffken | 29/157.3 D |
| 4,719,012 | 1/1988 | Groezinger et al. | 210/232 |
| 4,743,374 | 5/1988 | Stifelman | 210/440 |
| 4,832,844 | 5/1989 | Ayers | 210/440 |
| 4,834,885 | 5/1989 | Misgen et al. | 210/440 |
| 4,853,118 | 8/1989 | Brownell et al. | 210/130 |
| 4,855,047 | 8/1989 | Firth | 210/232 |
| 4,857,189 | 8/1989 | Thomsen et al. | 210/440 |
| 4,948,505 | 8/1990 | Petrucci et al. | 210/440 |

HIGH PRESSURE HYDRAULIC SPIN-ON FILTER

FIELD OF THE INVENTION

The present invention relates to a fluid filter of the spin-on type having a rigid cover linking a fluid housing and a filter element to a filter head assembly to provide increased pressure capacity over conventional filters.

BACKGROUND OF THE INVENTION

Spin-on filters have been employed in a variety of applications including hydraulic systems and engine lubrication systems for filtering fluids in the systems. Such filters generally include a filter element with a can or filter housing having a closed end and an open end. A cover is mounted in the open end of the filter housing and permits attachment of the filter housing to a filter head assembly. Fluid passes from the filter head assembly and is directed by a first opening structure into the filter housing for filtering. A second opening structure permits filtered fluid to exit the fluid housing and reenter the filter head assembly. Various seals typically exist to provide fluid tight seals between the various components. After use, the spin-on filters are typically replaced with new filters.

Although satisfactory in low- and medium-pressure applications, many conventional spin-on filters have not been particularly suitable for use in high-pressure applications where pressures may exceed 1000 psi or more. As the fluid system pressures are increased, many of the conventional spin-on filters are subject to failure in burst from pressure surges and spikes and in fatigue from cyclical loading.

In order to provide spin-on filters capable of withstanding high-pressure applications, various new designs have been developed to increase the pressure capacities of conventional spin-on filters. U.S. Pat. No. 4,369,113 issued to Donaldson Company, Inc., for an improved high-strength spin-on filter, is capable of withstanding pressures surges and spikes up to 1000 psi or more. U.S. Pat. No. 4,743,374, a later issued patent to Donaldson Company, Inc., for a high-strength filter with improved fatigue rating, further increased the pressure capacities of spin-on filters in the areas of fatigue and burst. In particular, the filter disclosed in the '374 patent has an increased fatigue life factor of about four to ten times greater than the filter disclosed in the '113 patent.

While these and other previous spin-on filters have improved the pressure capacities in terms of burst failure and fatigue failure limits, there is still a need in the art of high-pressure fluid filtration for further improvements in pressure capacities. The present invention addresses these and other problems associated with conventional spin-on filters.

SUMMARY OF THE INVENTION

The present invention relate to a spin-on filter mountable to a filter head assembly having a first fluid passage with a partially threaded exterior surface and a second fluid passage disposed within the first fluid passage. The filter has a generally cylindrical filter housing with an open end and a closed end. The filter further includes a generally cylindrical filter element disposed within the housing and has a closed end and an open end. The filter further includes an integral and one-piece rigid cover disposed in the open end of the housing. The cover includes a circular rim member extending into the housing. The rim member has an axial bore extending through the rim member defining an inner surface. The inner surface is partially threaded and includes a groove formed in the inner surface. The cover further includes a circular hub member having an axial bore through the hub member concentric with the axial bore of the rim member. A plurality of ribs interconnect the rim member to the hub member and cooperate with the rim member and the hub member to define a plurality of openings. The filter further includes a main seal seated in the groove of the rim member. The filter further includes structure for mounting the cover to the filter housing to form a unitary filter. To connect the cover to the filter head assembly, the rim member threadably and sealingly engages the exterior surface of the first fluid passage. In the connected state, the first fluid passage is in fluid communication with the openings and the second fluid passage is in fluid communication with the axial bore of the hub member.

The present invention also relates to a cover for use in connecting a filter housing to a filter head assembly wherein the filter housing contains a filter element having an exterior surface and an interior surface. The filter head assembly has a first fluid passage with a partially threaded exterior surface and a second fluid passage disposed within the first fluid passage. The cover comprises a circular rim member having an axial bore extending through the rim member from a top surface toward a bottom surface. The rim member includes threads on a portion of the inner surface formed by the axial bore. The rim member further includes main seal structure disposed on the inner surface between the threads and the bottom surface for sealing the rim member and the first fluid passage. The cover further includes a circular hub member having an axial bore extending through the hub member. The cover further includes a plurality of ribs interconnecting the rim member to the hub member and cooperating with the rim member and the hub member to define a plurality of openings between the rim member and the hub member. The cover further includes structure for mounting the cover to the filter housing. The rim member receives the filter head assembly in the axial bore of the rim member in a direction from the top surface toward the bottom surface. The rim member is threadably and sealingly engagable with the first fluid passage of the filter head assembly such that the first fluid passage is in fluid communication with the openings and the exterior surface of the filter element, and the second fluid passage is in fluid communication with the axial bore of the hub member and the interior surface of the filter element.

The present invention further relates to a filter apparatus which has a filter head assembly including a first fluid passage having a partially threaded exterior surface. The filter head assembly further includes a second fluid passage disposed within the first fluid passage. The filter apparatus further includes a cover having a rim member with an axial bore extending through the rim member from a top surface toward a bottom surface defining an inner surface. The inner surface is partially threaded and includes a groove formed in the inner surface disposed between the threads and the bottom surface. The cover includes a base portion having first opening structure and second opening structure for permitting fluid flow communication through the base portion. The filter apparatus further includes a main seal seated in the groove of the rim member. The filter apparatus further includes a filter housing having an open end where the cover is disposed in the open end. A filter element is disposed in an interior of the filter housing. The filter apparatus includes structure for mounting the cover to the filter housing. The axial bore of the rim member receives the filter head assembly in a direction from the top surface toward the bottom surface. The exterior surface of the first fluid passage threadedly engages the inner surface of the rim member to connect the cover and the filter housing to the filter head assembly. The main seal engages the exterior surface of the first fluid passage and the inner surface of the rim member to form a fluid tight seal. In the connected state, the first fluid passage is in fluid communication with the interior of the filter housing through the first opening structure, and the second fluid passage is in fluid communication with the interior of the filter housing through the second opening structure.

The present invention also relates to a spin-on filter having a generally cylindrical filter housing with an open end and a closed end. A generally cylindrical filter element is disposed in the filter housing. The filter element has a closed end and an open end and an exterior surface and an interior surface. Filter structure is disposed between the exterior surface and the interior surface for filtering fluid. A rigid cover of integral, one-piece construction is disposed in the open end of the filter housing. The cover includes a first fluid opening structure communicating with the interior surface of the filter element. The cover further includes a second fluid opening structure communicating with the exterior surface of the filter element. The cover further includes a plurality of tabs extending from the cover. The tabs engage the filter element about the exterior surface and cooperate to align the filter element with the cover. The filter further includes structure for sealing the open end of the filter element and the cover to permit fluid communication between the first fluid opening structure and the second fluid opening structure through the filter structure. The filter further includes structure for mounting the cover to the filter housing.

BRIEF DESCRIPTION OF THE DRAWINGS

In the drawings, wherein like reference numerals generally indicate corresponding parts throughout the several views.

BRIEF DESCRIPTION OF THE PREFERRED EMBODIMENT

Figure 1:
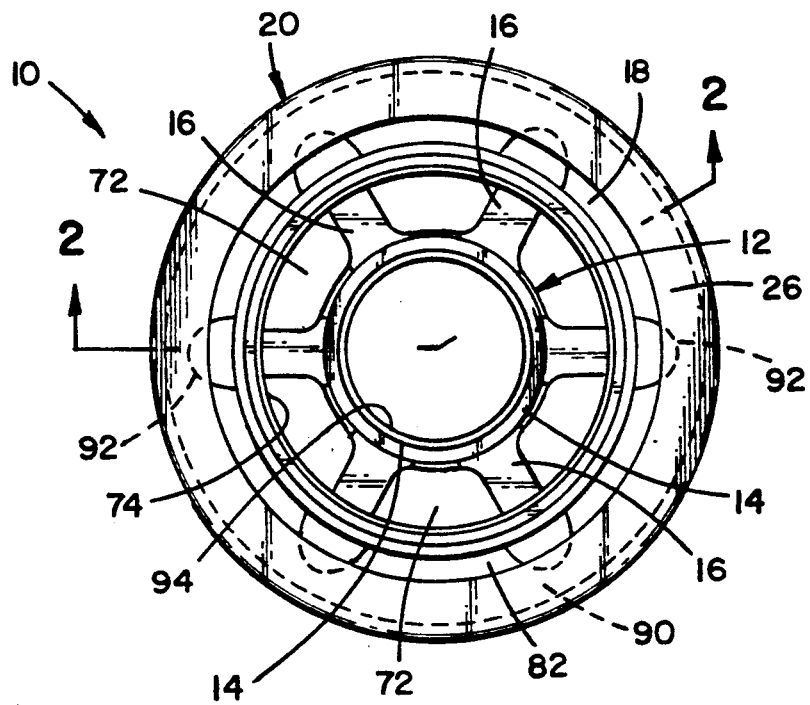
FIG. 1 is a top view of an embodiment of a spin-on filter according to the present invention.
Figure 2:
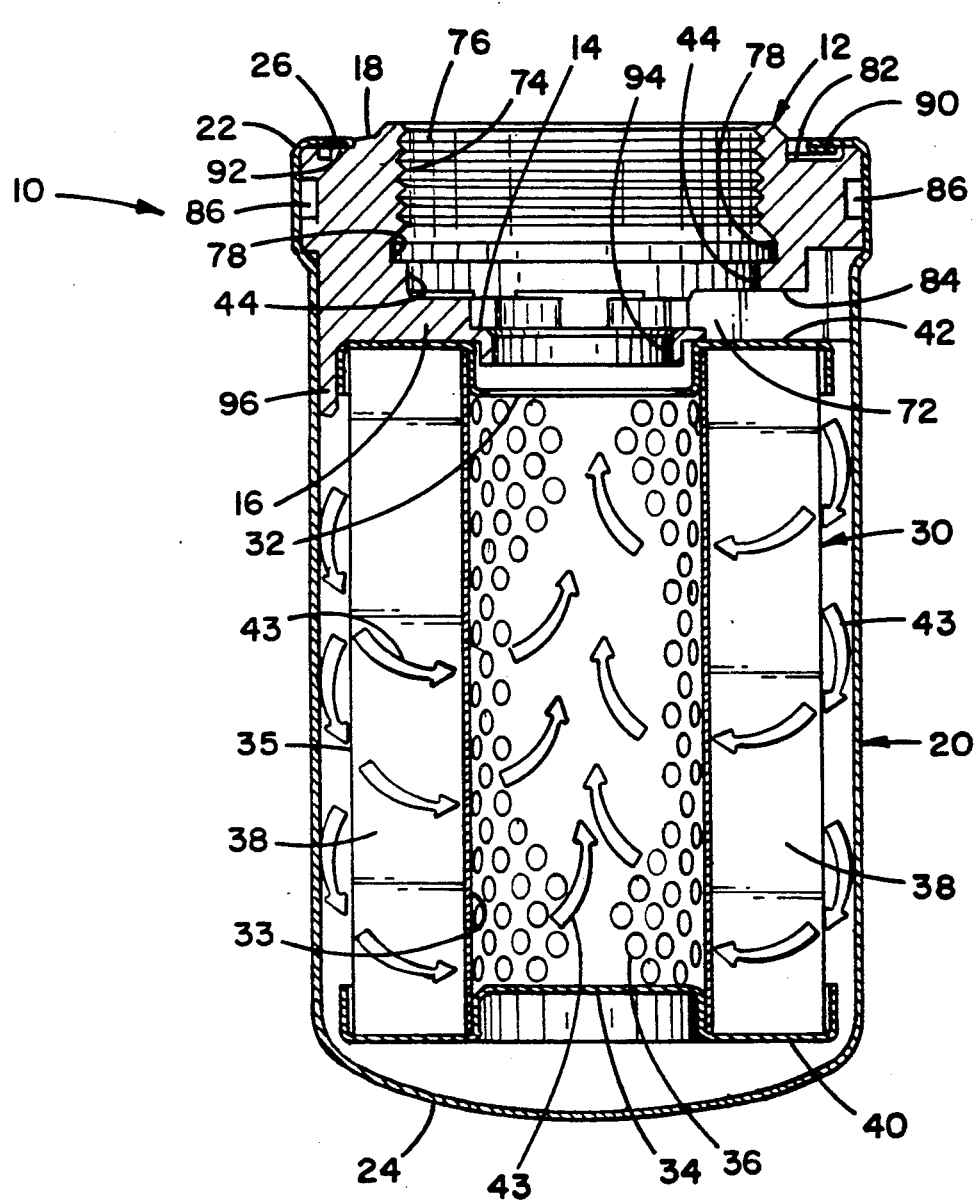
FIG. 2 is a cross-sectional side view of the filter shown in FIG. 1 taken along lines 2—2.

Referring now to FIGS. 1 and 2, there is shown an embodiment of an improved high pressure hydraulic spin-on filter or filter 10 for filtration of fluids or liquids such as oil, as used for example in hydraulic systems. Filter 10 comprises a generally cylindrical filter housing 20 having an open end 22 and a closed end 24. Filter housing 20 is of generally thin-walled construction and is typically formed from metal such as steel or other suitable material.

As best shown in FIG. 2, a hollow filter element 30 having a cylindrical shape is located inside the filter housing 20. The filter element 30 has an open end 32 formed by top member 42 and a closed end 34 formed by bottom member 40. The filter element 30 has a perforated core 36 located on an interior surface 33. In the preferred embodiment, the top member 42, the bottom member 40, and the perforated core 36 are made from metal. A filter member 38 surrounds the perforated core 36 and also forms an exterior surface 35 of the filter element 30. Fluid is filtered by passing through the filter element 30 in a direction from the exterior surface 35 through the filter member 38 and perforated core 36 to the interior surface 33. Arrows 43 in FIG. 2 illustrate the typical path of fluid through the filter 10.

Figure 4:
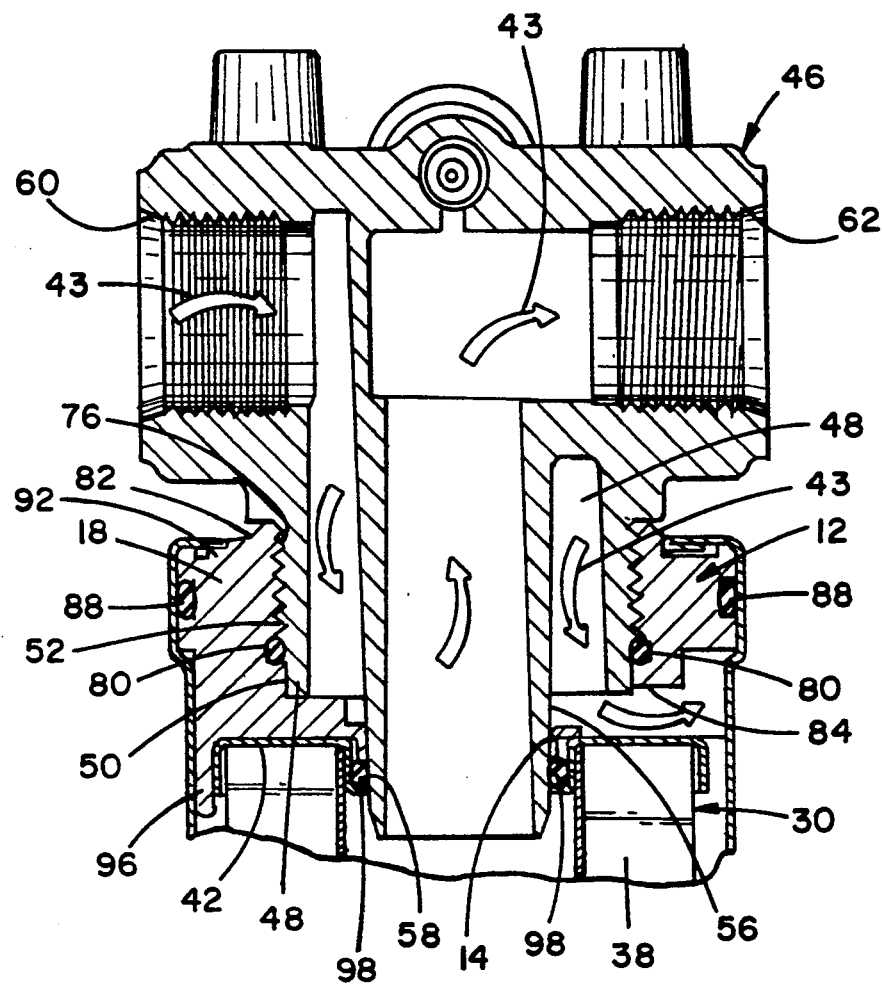
FIG. 4 is a partial cross-sectional view of the filter shown in FIG. 1 mounted to a filter head assembly.

The filter 10 includes a cover 12 disposed within the filter housing 20 adjacent the open end 22 to close off the open end 22 of the filter housing. Structure is provided to mount the cover 12 to the filter housing 20 to form a single unitary filter 10. The cover 12 further has structure which permits connection of the filter 10 to a filter head assembly 46, as is shown in FIG. 4. As will be discussed below in greater detail, in the preferred embodiment, the cover 12 is constructed such as to be of an integral and one-piece construction. Furthermore, the integral cover 12 is multifunctional in that the cover has structure which provides the cover 12 with several different functions in addition to linking the filter housing 20 to the filter head assembly 46.

The filter head assembly 46 shown in FIG. 4 is typically positioned in a hydraulic system (not shown) such that the system fluid is permitted to pass through the filter head assembly. Fluid is directed from the system by the filter head assembly 46 through the filter 10 for filtering and back to the filter head assembly to return to the system. The filter head assembly 46 includes a first fluid passage 48 having a generally circular cross-sectional shape which is in fluid communication with an inlet 60. The inlet 60 permits unfiltered fluid to enter the filter head assembly 46 which is then directed by first fluid passage 48 into filter 10. A second fluid passage 56 having a generally circular cross-sectional shape is provided in the filter head assembly 46 and is disposed within the first fluid passage 48. In the preferred embodiment, the second fluid passage 56 is generally concentric with the first fluid passage 48 and extends axially further into the filter 10 than does the first fluid passage 48. The second fluid passage 56 is in fluid communication with an outlet 62 and directs filtered fluid from the filter 10 to outlet 62 to exit from the filter head assembly 46. Arrows 43 in FIG. 4 illustrate the typical path of fluid through the filter head assembly 46. The filter head assembly is preferably made from metal or other such material capable of withstanding high pressure loadings.

The cover 12 includes a cylindrical rim member 72 having an axial bore 74 extending from a top surface 82 to a bottom surface 84. The cover 12 further includes a cylindrical hub member 14 having an axial bore 94 extending through the hub member. The axial bore 74 of the rim member 72 is concentric with the axial bore 94 of hub member 14. As shown in the preferred embodiment, the filter 10 has an outer diameter of the hub member 14 being less than a diameter of the axial bore 74 of the rim member 72. The cover 12 is further provided with a plurality of ribs 16 which interconnect the hub member 14 to the rim member 18. The ribs 16 cooperate with rim member 18 and hub member 14 to form a plurality of openings 72 between the hub member and the rim member. The openings 72 generally surround the hub member 14 as is best shown in FIG. 1. The hub member 14 and the ribs 16 form a base portion of cover 12 having first opening structure, the openings 72, and second opening structure, the axial bore 94, which permit fluid flow communication between the filter head assembly 46 and the interior of the filter housing 20. In the preferred embodiment, unfiltered fluid enters the filter 10 from the filter head assembly 46 through the openings 72 and filtered fluid exits the filter 10 through the axial bore 94 of the hub member 14 to the filter head assembly. The ribs 16 and the hub member 14 are in close proximity to top member 42 of filter element 30 and in some cases may engage the filter element 30.

In the preferred embodiment, the ribs are elongate structures which extend from the inner surface 44 of the rim member 18 adjacent the bottom surface 84 in a generally radially inward direction toward the hub member 14. The hub member 14 is positioned slightly below the rim member 18 in a direction toward the closed end 24 of the filter housing 20. As shown in the Figures, six equally-spaced ribs are employed in the preferred embodiment. It should be appreciated that the ribs could have a variety of shapes, and could be present in a variety of different numbers, and the hub member could be positioned differently relative to the rim member and still be within the principles of the present invention.

Cover 12 mounts to filter housing 20 by folding a portion 26 of the filter housing 20 adjacent the open end 22 inward over an outer periphery of the top surface 82 of the rim member 18. In the preferred embodiment, the folded portion 26 has multiple folds. To prevent rotation of the cover 12 relative to the filter housing 20, a plurality of equally-spaced radial projections 92 are provided in the preferred embodiment in the top surface 82 adjacent the outer periphery and are moved inward slightly from the outer edge. A groove is preferably formed in the top surface to receive the folded portion 26. The folded portion 26 of the filter housing 20 deforms slightly against radial projections 92 to prevent rotation of the cover 12 relative to the fluid housing 20.

The filter head assembly 46 and the filter 10 is provided with structure permitting removable attachment and sealing engagement of the filter head assembly 46 to the filter 10. An exterior surface 50 on first fluid passage 48 has threads 52 along a portion of the exterior surface. The cover 12 has threads 76 sized to engage threads 52 formed in an inner surface 44 of the rim member 18 defined by the axial bore 74. The threads 76 engage threads 52 of the first fluid passage 48 to threadably attach or connect the filter 10 to filter head assembly 46. In most applications, the filter head assembly 46 is maintained stationary while the filter 10 is rotated to connect the filter to the filter head assembly. In the connected position, the first fluid passage 48 is in fluid communication with the openings 72 and the exterior surface 35 of the filter element 30, and the second fluid passage 56 is in fluid communication with the axial bore 74 of the hub member 14 and the interior surface of the filter element 30. In this manner, unfiltered fluid entering the filter head assembly 46 at inlet 60 passes through filter element 30 and filtered fluid exits the filter head assembly 46 at inlet 62.

The location of threads 52 on the filter head assembly 46 is advantageous in that they are located on the first fluid passage 48 rather than on the inner, second fluid passage 56, as is sometimes the case with some conventional filter systems. One reason this is advantageous is that it permits the filter head assembly to be designed such that is will not fail under high pressure loading yet the fluid passages through the filter head assembly are sufficiently large enough to permit fluid flow. For example, one way to redesign convention filter head assemblies that attach to the second fluid passage to withstand higher pressures is to increase the wall thickness. However, in many conventional filters the only direction to increase the wall thickness is radially inwardly without having to substantially redesign the filter head assembly or the cover. This may create an undesirable restriction of fluid flow through the second fluid passage. In the present invention, by moving threads 52 to the first fluid passage 48, the filter head assembly 46 is sufficiently strong to with withstand high pressure loadings and fluid flow through the filter head assembly 46 is not excessively restricted.

Another advantage in moving threads 52 to the new location is that it may contribute to further minimizing any deflection of the cover 12 during loading. Forces tending to cause deflection under loading occur because the outer periphery 90 of the rim member 18 is fixed to the filter housing 20 and the axial bore 74 of the rim member is connected to the filter head assembly 46, creating a moment arm. The present invention may help to reduce deflection in covers which are prone to deflecting by reducing the wall thickness of the rim member 18 from the axial bore to the outside surface and by stiffening the cover 12 by removing the peripheral openings between the axial bore and the outer surface. As will be discussed below, the cover 12 is preferably sufficiently thick from the top surface 82 to the bottom surface 84 that deflection is not generally a problem.

As shown in FIG. 4, when the filter 10 and the filter head assembly 46 are in the connected position, the first fluid passage 48 is in close proximity to the inner surface 44 of rim member 18, and the second fluid passage 56 is in close proximity to the hub member 14 and filter element 30. To seal the filter 10 to the filter head assembly 46 to prevent fluid from exiting the system between the rim member 18 and the first fluid passage 48 of the filter head assembly 46, a main seal 80 is provided on the inner surface 44 between the rim member 18 and the first fluid passage 48. A second, inner seal 98 is provided to seal between the filter 10 and the second fluid passage 56 of the filter head assembly 46 to prevent fluid from bypassing being filtered by the filter element 30. It should be noted that the filter 10 shown in FIG. 2 is shown without the main seal 80 or the inner seal 98 in order to more clearly show the structure of the cover 12. The seals are shown in the proper positions in FIG. 4.

In the preferred embodiment, the main seal 80 is a flexible, resilient o-ring type seal. Preferably, the main seal 80 is maintained in a circumferentially surrounding groove 78 formed in the inner surface 44 between the threads 76 and the bottom surface 84 of rim 18. The groove 78 helps maintain the main seal 80 in the proper position for sealing and permits the main seal 80 to be retained by the filter 10 when the filter is connected to and removed from the filter head assembly 46. A flat portion 54 on the exterior surface 50 of the first fluid passage 48 provides a sealing surface to engage the main seal 80 between the first fluid passage 48 and the filter 10 and provide a fluid tight seal. It should be appreciated that in the alternative the groove 78 could be formed in the exterior surface 50 of the first fluid passage 48 and the rim member 18 could provide the flat sealing surface.

The positioning of main seal 80 and groove 78 in the embodiment shown is advantageous in that they are located on an inner surface 44 of cover 12 rather than a top surface 82 of cover 12, as is sometimes the case with conventional filters. One reason this change is advantageous is that the seal is located in a stiffer part of the cover 12. Another advantage is that the piston and bore type seal used in the present invention generally forms a better and stronger seal than a face type seal under high pressure loadings. Further, by moving the main seal 80 radially inwardly, the force exerted on the filter head assembly 46 under loading is reduced because the seal area is reduced. In addition, the main seal 80 location removes some structure from the top surface 82 of cover 12 to permit further widening of the axial bore 74 to further reduce any deflection problems of cover 12 and to further increase the dimensions of the filter head assembly 46.

Figure 3:
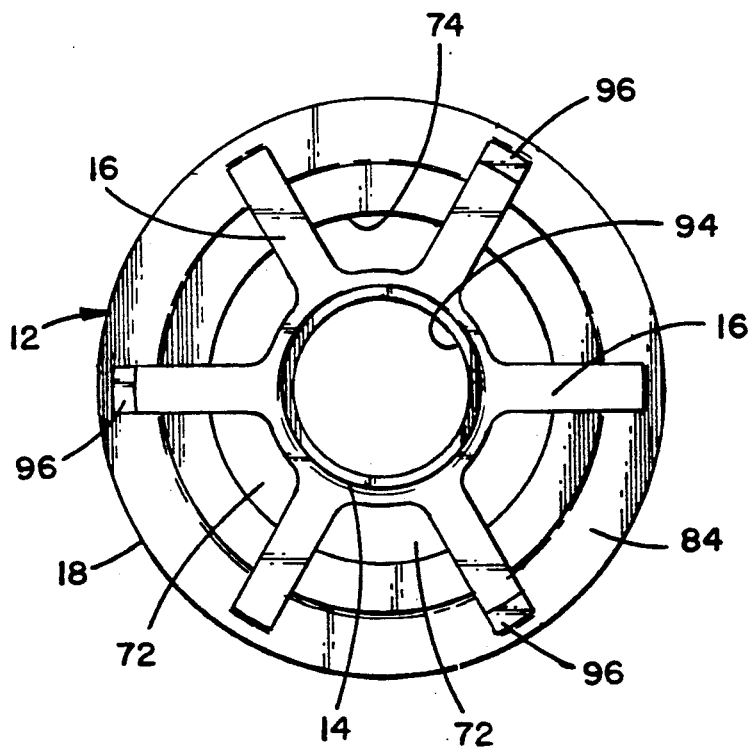
FIG. 3 is a bottom view of a cover of the filter shown in FIG. 1.

As shown in FIG. 4, the inner seal 98 is provided to seal between the filter 10 and the filter head assembly 46 to prevent fluid from bypassing the filter element 30. The inner seal 98 is positioned between the top member 42 of filter element 30, the hub member 14 of the cover 12, and second fluid passage 56 of the filter head assembly 46. A flat portion 58 on the second fluid passage 56 provides a sealing surface on the second fluid passage 56 to engage the inner seal 98. The inner seal 98 cooperates with the hub member 14, the top member 42, and the second fluid passage 56 to provide a fluid tight seal between the filter element 30, the hub member 14, and the filter head assembly 46 to prevent fluid from bypassing the filter element 30. As best shown in FIG. 3, the hub member 14 and the filter element 30 cooperate to form a three-sided retaining area such that the inner seal 98 may be placed in position during assembly of filter 10 and be properly positioned as the filter 10 is connected to the filter head assembly 46.

Filter 10 also preferably includes structure for sealing the cover 12 and the filter housing 20 to prevent fluid from exiting the system between the cover and the filter housing. As shown in FIG. 4, an outer seal 88 is provided to seal between the open end 22 of the filter housing 20 and the rim member 18 of the cover 12. In the preferred embodiment, outer seal 88 is a flexible, resilient o-ring type seal. The outer seal 88 preferably is maintained in a circumferentially surrounding groove 86 formed in the rim member 18. The filter housing 20 and the cover 12 cooperate with the outer seal to provide a fluid tight seal between the filter housing 20 and the cover 12. It should be noted that the filter 10 shown in FIG. 2 is shown without the outer seal 88 in order to more clearly show the structure of the cover 12. During assembly of filter 10, the outer seal 88 is placed in the groove 86 before the cover 12 is placed in the filter housing 20.

As shown in FIGS. 2-4, the preferred embodiment of filter 10 includes plurality of tabs 96 extending from the cover 12 into the filter housing 20. The tabs 96 are positioned to engage the filter element 30 about a portion of the exterior surface 35 to align the filter element with the cover. The tabs 96 help to prevent the filter element 30 from disengagement from the hub member 14 to align the main seal 80 until engaged by second fluid passage 56 of the filter head assembly 46. The tabs 96 also help to maintain alignment of the filter element 30 and cover 12 by acting to compensate for any extra space in the filter housing 20 that permits the filter element to move axially toward the closed end 24 of the filter housing when the system pressure is reduced. As shown in FIG. 4, three equally spaced tabs are provided, however, any number of tabs could be provided as long as they cooperate to align the filter element with the cover. The tabs 96 are advantageous in that the tabs permit less structure to be present near or on the hub member 14 to engage the interior surface 33 of filter element 30 to maintain alignment with the cover 14. As noted above, one important function of the hub member 14 is to cooperate with the filter element 30, the filter housing 46, and the inner seal 98 to seal the unfiltered side from the filtered side. Separating the alignment function of cover 12 from the unfiltered/filtered sealing function helps to simplify design of cover 12 and filter element 30.

In the preferred embodiment shown, the cover 12 is of integral and one-piece construction and is made from a material capable of withstanding high pressures. In the preferred embodiment, the cover 12 is made from die cast aluminum. The various structural features that comprise the multifunctional cover can be directly formed in the cover during casting or machined into the cover after casting. Preferably, the cover 12 is sufficiently thick and has a material elasticity such that the cover does not appreciably deflect to reduce sealing problems and material failure problems that often occur with some conventional filters.

Preliminary test results have confirmed that a spin-on filter constructed according to the principles of the present invention further improves burst strength and fatigue life over conventional filters. In particular, some tests have shown that the filter 10 improved burst strength over the filter disclosed in the '374 patent to Donaldson Company, Inc., by more than double and significantly improved the fatigue life of the filter beyond the typical fatigue life of the same filter disclosed in the '74 patent.

It is to be understood that even though numerous characteristics and advantages of the invention have been set forth in the foregoing description, together with details of the structure and function of the invention, the disclosure is illustrative only and changes may be made in detail, and especially in matter of shape, size, and arrangement of the parts, wherein the principles of the invention to the full extent indicated by the broad general meaning of the terms in which the appended claims are expressed.

We claim:

1. A spin-on filter connectable to a filter head assembly having a first fluid passage with a partially threaded exterior surface and a second fluid passage disposed within said first fluid passage, said spin-on filter comprising:

a generally cylindrical filter housing with an open end, a closed end, and an interior;

a generally cylindrical filter element disposed within said interior of said filter housing, said filter element having a closed end and an open end;

an integral and one-piece rigid cover disposed in said open end of said filter housing adjacent said open end of said filter element, said cover including:

a circular rim member extending into said filter housing, said rim member having an axial bore extending through said rim member defining an inner surface, said inner surface being partially threaded, said rim member having a groove formed in said inner surface;

a circular hub member having an axial bore through said hub member concentric with said axial bore of said rim member, said axial bore of said hub member being smaller than said axial bore of said rim member; and a plurality of ribs interconnecting said rim member to said hub member, said ribs cooperating with said rim member and said hub member to define a plurality of openings between said rim member and said hub member;

a main seal seated in said groove of said rim member;

means for mounting said cover to said filter housing; and said cover receiving said filter head assembly to connect said filter to said filter head assembly wherein said rim member threadably and sealingly engages said exterior surface of first fluid passage, and said first fluid passage is in fluid communication with said interior of said filter housing through said openings and said second fluid passage is in fluid communication with said interior of said filter housing through said axial bore of said hub member.

2. The spin-on filter of claim 1, wherein said groove and said main seal are disposed in said inner surface of said rim member in a direction from said threads toward said closed end of said filter housing.

3. The spin-on filter of claim 1, wherein an outer diameter of said hub member is less than a diameter of said axial bore of said rim member.

4. The spin-on filter of claim 1, wherein said ribs extend from said inner surface of said rim member toward said hub member.

5. The spin-on filter of claim 1, wherein said means for mounting said cover to said filter housing includes a plurality of circumferentially spaced-apart radial projections formed into a top surface of said rim, and a portion of said filter housing adjacent said open end surrounding and being folded inwardly over an outer periphery of said top surface of said rim member to secure said cover and said filter housing against both separation and rotation.

6. The spin-on filter of claim 5, further comprising an outer seal between said cover and said filter housing.

7. The spin-on filter of claim 6, wherein said rim member includes a groove formed in an outer cylindrical surface of said rim facing said filter housing, said outer seal being positioned in said groove and engaging said rim member and said filter housing to form a fluid tight seal.

8. The spin-on filter of claim 1, wherein said cover includes a plurality of tabs extending from said cover, said tabs engaging said filter element about an exterior surface to align said filter element with said cover.

9. The spin-on filter of claim 1, further comprising means for sealing said open end of said filter element between said filter element and said cover.

10. The spin-on filter of claim 9, wherein said means for sealing said open end of said filter element includes an inner seal between said hub member and said open end of said filter element.

11. The spin-on filter of claim 1, wherein said cover includes six equally spaced ribs.

12. A cover for use in connecting a filter housing to a filter head assembly, said filter housing containing a filter element having an exterior surface and an interior surface, said filter head assembly having a first fluid passage having a partially threaded exterior surface, and a second fluid passage disposed within said first fluid passage, said cover comprising:

a circular rim member having an axial bore extending through said rim member from a top surface toward a bottom surface, said rim member including threads on a portion of an inner surface formed by said axial bore, said rim member further including main seal means disposed on said inner surface between said threads and said bottom surface for sealing said rim member and said first fluid passage;

a circular hub member having an axial bore extending through said hub member, said axial bore of said hub member being smaller than said axial bore of said rim member;

a plurality of ribs interconnecting said rim member to said hub member, said ribs cooperating with said rim member and said hub member to define a plurality of openings between said rim member and said hub member;

means for mounting said cover to said filter housing; and said rim member receiving said filter head assembly in said axial bore of said rim member in a direction from said top surface toward said bottom surface, said rim member being threadably and sealingly engagable with said first fluid passage of said filter head assembly, said first fluid passage being in fluid communication through said openings with said exterior surface of said filter element, and said second fluid passage being in fluid communication through said axial bore of said hub member with said interior surface of said filter element.

13. The cover of claim 12, wherein said main seal means includes a groove formed in said inner surface of said rim member, said groove being sized to receive a flexible, resilient main seal member, said main seal means further including a flexible, resilient main seal member seated in said groove, wherein said main seal member is engagable with said first fluid passage to form a fluid tight seal between said rim member and said first fluid passage.

14. The cover of claim 12, wherein said means for mounting said cover to said filter housing includes a plurality of circumferentially spaced-part radial projections formed on said top surface of said rim, and a portion of said filter housing being foldable inwardly over an outer periphery portion of said top surface of said rim to secure said cover to said filter housing against both separation and rotation.

15. The cover of claim 12, wherein said rim member includes a groove formed in an outer cylindrical surface of said rim, said groove receiving an outer seal for forming a fluid tight seal between said rim member and said filter housing.

16. The cover of claim 12, wherein said rim member includes a plurality of tabs extending from said from said bottom surface of said rim member, said tabs engaging said filter element about an exterior surface of said filter element to align said filter element with said cover.

17. The cover of claim 12, further comprising an inner seal between said hub member, said filter element, and said second fluid passage, said inner seal engagable with said hub member, said filter element, and said second fluid passage to form a fluid tight seal.

18. A spin-on filter, comprising:

a generally cylindrical filter housing with an open end and a closed end;

a generally cylindrical filter element disposed in said filter housing, said filter element having a closed end and an open end, and an exterior surface and an interior surface, and filter means disposed between said exterior surface and said interior surface for filtering fluid;

a rigid cover being of integral, one-piece construction disposed in said open end of said filter housing, said cover including first fluid opening means communicating with said interior surface of said filter element, said cover further including second fluid opening means communicating with said exterior surface of said filter element, said cover further including a plurality of filter element centering tabs extending from said cover, said filter element centering tabs engaging said filter element about said exterior surface of said filter element, said filter element centering tabs cooperating to align said filter element with said cover;

means for sealing said open end of said filter element and said cover to permit fluid communication between said first fluid opening means and said second fluid opening means through said filter means; and means for mounting said cover to said filter housing.

19. A spin-on filter connectable to a filter head assembly having a first fluid passage with a partially threaded exterior surface and a second fluid passage disposed within said first fluid passage, said spin-on filter comprising:

a generally cylindrical filter housing with an open end and a closed end;

a generally cylindrical filter element disposed within said filter housing, said filter element having a closed end and an open end;

an integral and one-piece rigid cover disposed in said open end of said filter housing adjacent said open end of said filter element, said cover including:

a circular rim member extending into said filter housing, said rim member having an axial bore extending through said rim member defining an inner surface, said inner surface being partially threaded, said rim member having a groove formed in said inner surface;

a circular hub member having an axial bore through said hub member concentric with said axial bore of said rim member, wherein an outer diameter of said hub member is less than a diameter of said axial bore of said rim member; and a plurality of ribs interconnecting said rim member to said hub member, said ribs cooperating with said rim member and said hub member to define a plurality of openings between said rim member and said hub member;

a main seal seated in said groove of said rim member;

means for mounting said cover to said filter housing; and said cover receiving said filter head assembly to connect said filter to said filter head assembly wherein said rim member threadably and sealingly engages said exterior surface of firs fluid passage, and said first fluid passage is in fluid communication with said openings and said second fluid passage is in fluid communication with said axial bore of said hub member.

20. A filter apparatus comprising:

a filter head assembly including a first fluid passage having a partially threaded exterior surface, said filter head assembly further including a second fluid passage disposed within said first fluid passage;

a cover including:

a rim member having an axial bore extending through said rim member from a top surface toward a bottom surface and defining an inner surface, said inner surface being partially threaded, said inner surface including a groove formed in said inner surface disposed between said threads and said bottom surface;

a hub member having an axial bore smaller than said axial bore of said rim member; and a plurality of ribs connecting said rim member to said hub member, said ribs defining at least one opening through said cover;

a main seal seated in said groove of said rim member;

a filter housing having an open end, said cover being disposed in said open end;

a filter element disposed in an interior of said filter housing;

means for mounting said cover to said filter housing; and said axial bore of said rim member receiving said filter head assembly in a direction from said top surface toward said bottom surface wherein said exterior surface of said first fluid passage threadably engages said inner surface of said rim member to connect said cover to said filter head assembly, said main seal engaging said exterior surface of said first fluid passage and said inner surface of said rim member to form a fluid tight seal, said first fluid passage being in fluid communication with said interior of said filter housing through said at least one opening through said cover, said second fluid passage being in fluid communication with said interior of said filter housing through said axial bore of said hub member, wherein fluid is filtered by said filter element as said fluid passes from said first fluid passage to said second fluid passage through said interior of said filter housing.

21. A spin-on filter for filtering fluid, said spin-on filter connectable to a filter head assembly having a first fluid passage with a partially threaded exterior surface passage, said spin-on filter comprising:

a generally cylindrical filter housing with an open end and a closed end;

a generally cylindrical filter element disposed within said filter housing, said filter element having a closed end and an open end;

an integral and one-piece rigid cover disposed in said open end of said filter housing adjacent said open end of said filter element, said cover including:

a circular rim member extending into said filter housing, said rim member having an axial bore extending through said rim member defining an inner surface, said inner surface being at least partially threaded;

a circular hub member having an axial bore through said hub member concentric with and smaller than said axial bore of said rim member; and a plurality of ribs interconnecting said rim member to said hub member, said ribs cooperating with said rim member and said hub member to define a plurality of openings between said rim member and said hub member;

means for mounting said cover to said filter housing;

said cover receiving said filter head assembly to connect said filter to said filter head assembly wherein said rim member threadably engages said exterior surface of first fluid passage, and said axial bore of said hub member receives said second fluid passage, and wherein said first fluid passage is in fluid communication with an interior of said filter housing through said openings and said second fluid passage is in fluid communication with said interior of said filter housing through said axial bore of said hub member;

a main seal positioned to seal between said rim member and said filter head assembly to seal said interior of said filter housing from the atmosphere surrounding said filter and said filter head assembly; and a second seal positioned around said second fluid passage to seal between said hub member, said open end of said filter element, and an exterior surface of said second fluid passage, thereby forming a fluid flow path from said first fluid passage, through said openings to said interior of said filter housing for filtering of the fluid by said filter element, and from said interior of said fluid housing after filtering of the fluid, through said axial bore of said hub to said second fluid passage.

* * * * *

UNITED STATES PATENT AND TRADEMARK OFFICE
CERTIFICATE OF CORRECTION

PATENT NO. : 5,104,537

DATED : April 14, 1992

INVENTOR(S) : Stifelman et al.

It is certified that error appears in the above-identified patent and that said Letters Patent is hereby corrected as shown below:

Column 5, lines 6/7
    DELETE "permit" and INSERT therefor --permits--.

Column 6, line 4
    DELETE "is" and INSERT therefor --it--.

Column 6, line 7
    DELETE "convention" and insert therefor --conventional--.

Column 6, line 17
    DELETE "with" after the word "to".

Column 7, line 60
    INSERT --a-- after the word "includes".

Column 8, line 11
    DELETE "14" and INSERT therefor --12--.

Column 8, line 40
    DELETE "'74" and INSERT therefor --'374--.

Column 10, line 58 (claim 16)
    DELETE "from said" after the word "extending".

Column 11, line 63 (line 19)
    DELETE "firs" and INSERT therefor --first--.

Column 12, claim 21 between 47 & 48
    INSERT --and a second fluid passage disposed within said first fluid-- after the word "surface".

UNITED STATES PATENT AND TRADEMARK OFFICE
CERTIFICATE OF CORRECTION

PATENT NO. : 5,104,537

DATED : April 14, 1992

INVENTOR(S) : Stifelman et al.

It is certified that error appears in the above-identified patent and that said Letters Patent is hereby corrected as shown below:

Column 8, line 47
        DELETE "wherein" and INSERT therefor --within--.

Signed and Sealed this

Twenty-first Day of December, 1993

Attest:

BRUCE LEHMAN

*Attesting Officer*         *Commissioner of Patents and Trademarks*